US006826233B1

(12) United States Patent
Oosawa

(10) Patent No.: US 6,826,233 B1
(45) Date of Patent: Nov. 30, 2004

(54) APPARATUS AND METHOD FOR DATA TRANSMISSION

(75) Inventor: Hajime Oosawa, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 754 days.

(21) Appl. No.: 09/668,737

(22) Filed: Sep. 25, 2000

(30) Foreign Application Priority Data

Dec. 28, 1999 (JP) .......................................... 11-373524

(51) Int. Cl.[7] .......................... H04N 7/12; H04N 11/02
(52) U.S. Cl. .............................. 375/240.27; 375/240.24
(58) Field of Search ....................... 375/240.01–240.07, 375/240.12, 240.13, 240.14, 240.15, 240.25, 240.26, 240.27, 240.29

(56) References Cited

U.S. PATENT DOCUMENTS

| | | | | |
|---|---|---|---|---|
| 5,923,679 A | * | 7/1999 | Itoh et al. ................... | 714/752 |
| 5,933,567 A | * | 8/1999 | Lane et al. ................... | 386/68 |
| 6,108,379 A | * | 8/2000 | Shikakura et al. .......... | 375/240 |
| 6,229,437 B1 | * | 5/2001 | Schmid et al. .............. | 340/438 |
| 6,522,672 B1 | * | 2/2003 | Matsuzaki et al. .......... | 370/539 |
| 6,526,173 B1 | * | 2/2003 | Burns ......................... | 382/236 |
| 6,570,926 B1 | * | 5/2003 | Agrawal et al. ....... | 375/240.27 |
| 6,587,985 B1 | * | 7/2003 | Fukushima et al. ......... | 714/748 |
| 2002/0053049 A1 | * | 5/2002 | Shiomoto et al. ........... | 714/701 |

FOREIGN PATENT DOCUMENTS

| | | |
|---|---|---|
| JP | 11-196037 | 7/1999 |
| WO | WO 98/36559 | 8/1998 |
| WO | WO 99/12126 | 3/1999 |

OTHER PUBLICATIONS

Fritz Seytter et al., "An Efficient Multiplex Architecture for Mobile MPEG–4 Systems," Signal Processing: Image Communication vol. 14 (1999), pp. 599–606.

Luis Ducla–Soares et al., "Error Resilience and Concealment Performance for MPEG–4 Frame–Based Video Coding," Signal Processing: Image Communication, vol. 14 (1999), pp. 447–472.

Heinzelman et al., "Unequal Error Protection of MPEG–4 Compressed Video," Image Processing 1999, ICIP 99 Proceedings, 1999 International Conference on Kobe, Japan, Oct. 24–28, 1999, pp. 530–534.

Noriko Suzuki et al., "An Error–Controlling Scheme According to the Importance of Individual Segments of Model–Based Coded Facial Images, " IEICE Transactions on Fundamentals of Electronics, Communications and Computer Sciences, E77–A (Aug. 1994), No. 8, Tokyo, Japan, pp. 1289–1296

Jaochim Laier et al., "Content–Based Multimedia Data Access in Internet Video Communication," First International Workshop on Wireless Image/Video Communications—Sep. 1996, pp. 126–133.

* cited by examiner

Primary Examiner—Chris Kelley
Assistant Examiner—Dave Czekaj
(74) Attorney, Agent, or Firm—Finnegan, Henderson, Farabow, Garrett & Dunner, L.L.P.

(57) ABSTRACT

A data transmission apparatus for transmitting data comprising a plurality of objects having respective priority, comprises an error-correction coding section for selecting an error-correction coding method for each of the plurality of objects based on the priority of each of the plurality of objects and error-correction coding of each of the plurality of objects using the selected error-correction coding method. Therefore, it is possible to effectively use the resources, maintain the real-time transmission of data, and prevent degradation of transmitted data by changing the level of the error-correction according to the priority of object, and performing the error-correction coding for the objects according to the priority.

20 Claims, 4 Drawing Sheets

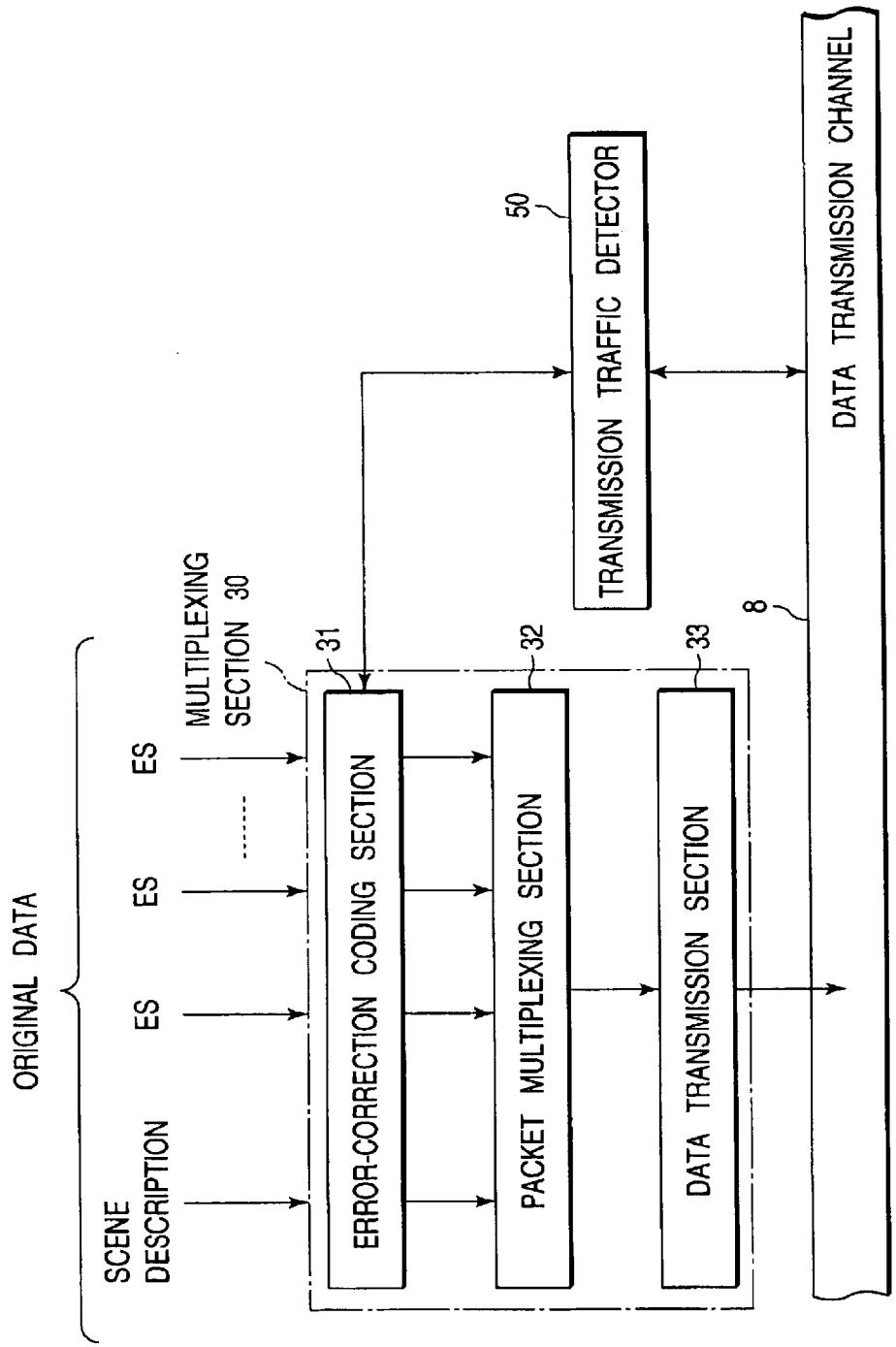
F I G. 5

APPARATUS AND METHOD FOR DATA TRANSMISSION

CROSS-REFERENCE TO RELATED APPLICATIONS

This application is based upon and claims the benefit of priority from the prior Japanese Patent Application No. 11-373524, filed Dec. 28, 1999, the entire contents of which are incorporated herein by reference.

BACKGROUND OF THE INVENTION

The present invention relates to an apparatus and a method for data transmission to efficiently transmit multimedia data comprised of a plurality of objects in real time through an information transmission channel in which data errors may occur.

The MPEG-4 method (a method by a standardization group for motion picture compression of ISO/IEC), which is one of international standards for compression of motion picture coding method supports "object coding" to transmit a plurality of objects (visual and audio objects, and the like) after multiplexing. For example, a transmission side transmits one object of moving picture only for persons, and one object only for a background. Then, the receiving side decodes and synthesizes them to display them for reproduction of an image with a person or persons in a background image.

FIG. 1 shows the above flow. The object coding will be described with reference to FIG. 1. Object coding sections 1 are installed for each object. Original data is supplied to the object coding sections 1 and a scene description coding section 2. The object coding section 1 compresses and codes an object such as a moving picture and an audio, to output it as a data stream. The scene description coding section 2 codes a scene description. The scene description is information for reproduction of the objects which are compressed and coded at the object coding sections 1 as one scene. The outputs of the object coding sections 1 and the scene description coding section 2 are multiplexed at a multiplexing section 3. The multiplexed data is transmitted to the receiving side through a data transmission channel 8.

At the receiving side, the multiplexed data is demultiplexed to coded data of objects and scene description by a data demultiplexing section 4. The coded object data and the scene description are separately processed. Object decoding sections 5 decode the coded object data. A scene description decoding section 6 decodes the coded scene description. A scene synthesizing section 7 synthesizes the object data from the object decoding sections 5 for reproduction, based on the scene description from the scene description decoding section 6.

In a conventional device having the above configuration, the object coding section 1 compresses and codes object data such as moving picture and audio. Each coded object data is made into stream, which is called as an elementary stream.

The scene description coding section 2 codes a scene description for reproduction as one scene by synthesizing the objects. The data multiplexing section 3 multiplexes data from the object coding sections 1 and the scene description coding section 2 to transmit them through the data transmission channel 8 as one stream. The data received through the data transmission channel 8 is supplied to the data demultiplexing section 4, which demultiplexes the multiplexed data into the coded data of objects and scene description. The coded data of objects are supplied to the object decoding sections 5, and the scene description to the scene decoding section 6.

The object decoding section 5 decodes the coded object data to supply the object data to the scene synthesizing section 7, and the scene description decoding section 6 decodes the coded scene description to supply the scene description to the scene synthesizing section 7.

The scene synthesizing section 7 synthesizes scenes for reproduction of images, based on the object data from the object decoding sections 5 and the scene description from the scene description decoding section 6. The scene description denotes priority of the elementary stream corresponding to each of individual objects.

The priority is given to the objects according to production intention of an author who produces a multimedia content. For example, the priority is given to an object which the author looks upon as an important one, or to object with greater importance, as an object of persons generally has greater importance than those of backgrounds.

On the other hand, in wireless communication, there have been some cases where a mechanism to guarantee completeness of the data is introduced in the lower layers of a communication protocol such as a physical layer and a data-link layer by using a method through which detection of error at the receiving side causes request for re-transmission from the receiving side to the transmission side and the transmission side retransmits the data responding to the request when a transmission channel with high possibility of data errors such as wireless communication is used.

However, the above method may not be applied to communications which require real-time transmission such as MPEG-4 of so-called stream data as one of important factors, since there is a serious problem such as a time lag required for the re-transmission.

There are increased possibility to cause pauses in reproduction of moving picture and audio at the receiving side due to time lags for the re-transmission, though it is important to maintain real-time transmission in the transmission of the stream data. The pauses in the moving picture and audio become degradations in application qualities themselves.

Thereby, in general real-time communication of multimedia data, it has been usual not to perform re-transmission of data at the physical layer and the data-link layer even with possible loss of the completeness of the data, except when there are remarkably many errors in the transmission channel. Therefore, there may be a case where a part of data are not transmitted.

On the other hand, there has been a method to protect information by forward error-correction (FEC) where transmission is performed by adding redundant information to original information, considering possible errors in the upper layers. For example, the method is found in a "H.233" standard, as a typical protocol for multiplexing and demultiplexing in videophone application. In "Annex A", "Annex B", and "Annex C", and "Annex D" of the "H.233" standard, information is defined to be protected based on the FEC.

However, as there is no consideration of contents of data to be transmitted for "protection of information" in the above standard, the same error-correction information is uniformly added to all data without consideration of the importance of each data. Then, data with greater importance, and those with less importance have the same error rate. But, as the real-time transmission is an important factor, and objects have their own importance, in the MPEG-4, it is useless to perform the error-correction coding with the same level of error-correction for every object, and there may be a case to lose the real-time transmission. Therefore, the resources are not effectively used.

BRIEF SUMMARY OF THE INVENTION

Accordingly, it is an object of the present invention to provide an apparatus and a method for data transmission, in which it is possible to effectively use the resources, maintain the real-time transmission of data, and prevent degradation of transmitted data by changing the level of the error-correction according to the importance of object, and performing the error-correction coding for the objects according to the importance.

According to the present invention, there is provided a data transmission apparatus for transmitting data comprising a plurality of objects having respective priority, the apparatus comprising means for selecting an error-correction coding method for each of the plurality of objects based on the priority of each of the plurality of objects, means for error-correction coding of each of the plurality of objects using the selected error-correction coding method, and means for multiplexing plurality of coded object data and transmitting multiplexed data through a transmission channel.

According to the present invention, it may be possible to further comprises means for detecting a traffic quality of the transmission channel, and said selecting means may select an error-correction coding method based on the priority of each object and the traffic quality.

According to the present invention, there is provided a data reception apparatus for receiving coded transmission data comprising a plurality of coded object data, each object having a priority, the apparatus comprising means for receiving and demultiplexing the coded transmission data into the plurality of coded object data, means for detecting the priority of each object, and means for error-correction decoding of each of the coded object data based on the priority detected by said detecting means.

According to the present invention, there is provided an object coding apparatus for transmitting data formed of a plurality of object data and scene description data, each object having a priority, the scene description data indicating the priority of each object and how the object data are synthesized, the apparatus comprising means for determining error-correction coding methods for the plurality of object data respectively based on the priority, means for error-correction coding of each of the plurality of object data using the determined error-correction coding methods, means for error-correction coding of the scene description data using a predetermined error-correction correction coding method, and means for multiplexing coded scene description data and a plurality of coded object data and transmitting multiplexed data.

According to the present invention, there is provided an object coding/decoding system comprising means for determining error-correction coding methods for the plurality of object data respectively based on the priority, means for error-correction coding of each of the plurality of object data using the determined error-correction coding methods, means for error-correction coding of the scene description data using a predetermined error-correction coding method, means for multiplexing coded scene description data and a plurality of coded object data and transmitting multiplexed data, means for receiving and demultiplexing the multiplexed data from said object coding apparatus into the coded scene description data and the plurality of coded object data, means for detecting the priority of each object from the coded scene description data, means for error-correction decoding of each of the plurality of coded object data using a decoding method based on the priority detected by said detecting means, means for error-correction decoding of the coded scene description data using a predetermined decoding method, and means for synthesizing plurality of decoded object data based on a decoded scene description.

According to the present invention, it is possible to effectively use the resources, maintain the real-time transmission of data, and prevent degradation of transmitted data by changing the level of the error-correction according to the importance of object, and performing the error-correction coding for the objects according to the importance.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 5 shows a block diagram of a configuration example of a principal part of a second embodiment of a data transmission apparatus of the present invention.

DETAILED DESCRIPTION OF THE INVENTION

Figure 1:
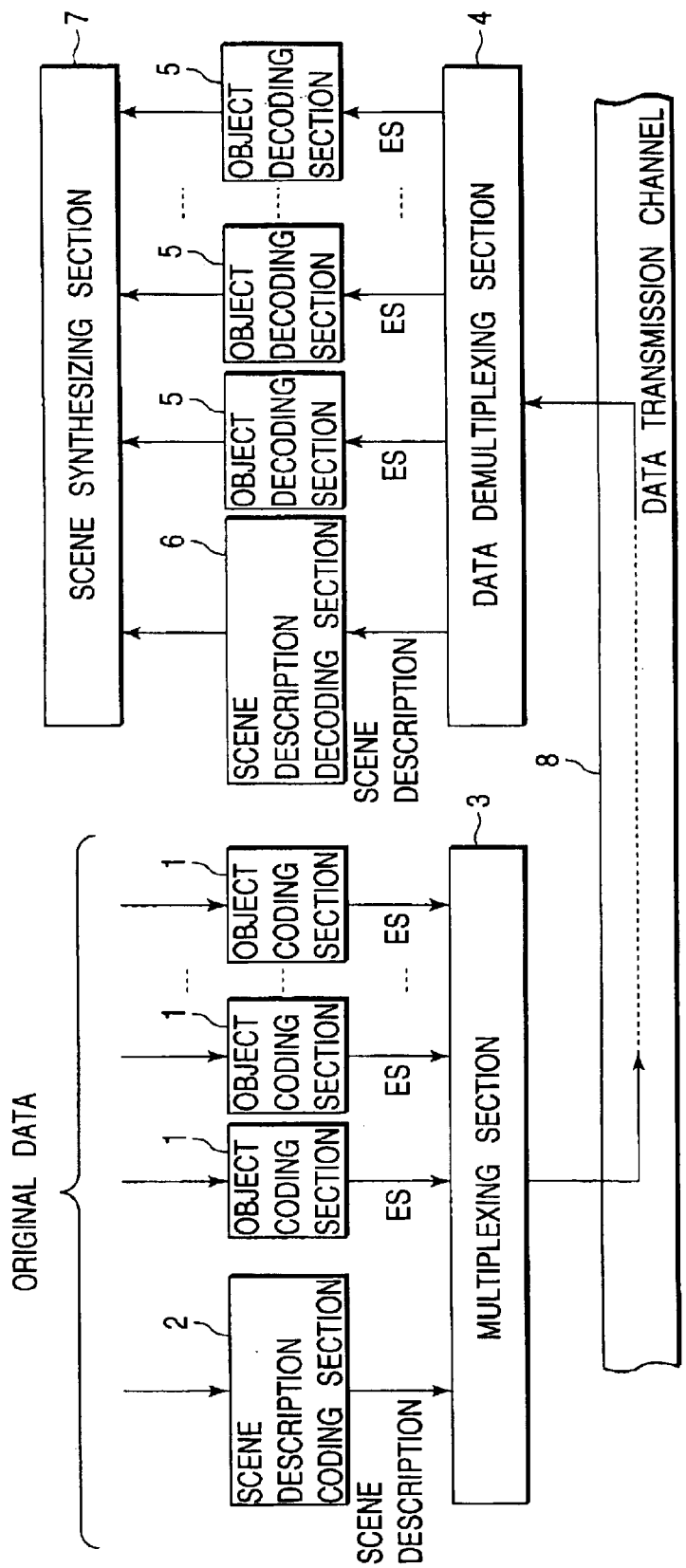
FIG. 1 shows a block diagram of a conventional data transmission apparatus.

A preferred embodiment of a data transmission apparatus according to the present invention will now be described with reference to the accompanying drawings.

Firstly, a basic principle of the present invention will be described. In the present invention, data with relatively greater importance is protected in data transmission on a transmission channel with possible errors by performing error-correction according to a priority of the data, referring to a stream priority included in the MPEG-4 objects not only in the MPEG-4 system, but also in a data multiplexing and transmission section.

The present invention relates to a transmission system which multiplexes a plurality of objects (visual objects, audio object and the like), and transmits multiplexed data through a transmission channel. In the system, the priority denoting the priority on importance is previously given to each object and real-time transmission is required, for example, data transmission according to the MPEG-4. The priority, which the MPEG-4 has, for each object, is utilized such that an error-correction coding method is selected according to the priority of each object, and error-correction coding is performed according to the selected error-correction coding method. Therefore, an increase of data amount is prevented while protecting data with relatively greater importance. Thereby, it is possible to maintain real-time transmission of objects so that there is no pause in moving picture data and audio data at the receiving side and to prevent the degradation of data at reproduction.

The priority given to each object in the MPEG-4 is used within reproduction process of MPEG-4, and assumed to be applied to the cases shown as follows:

(i) reproduction of objects with less priority is temporarily stopped, or reproduction quality of objects with less priority is degraded, when there is an insufficiency in reproduction ability of the MPEG-4 decoder at the receiving side;

(ii) transmission of objects with less priority is temporarily stopped in the MPEG-4 system at the transmission side, when there is an insufficiency in reproduction ability of the MPEG-4 decoder at the receiving side.

However, in an actual transmitting and receiving system to transmit data of MPEG-4, the data multiplexing section, and the data transmission section in the transmitting system (in many cases, the two sections are realized as one operational block. They are called as "data multiplexing/transmission section (Trans Mux)") are assumed to basically use standard methods (MPEG-2 TS, H.223, RTP, and the like.). Transmission control considering the priority of objects like the present invention is actually beyond the limits of the standard.

Therefore, the above priority has not been considered to be used at the data multiplexing section and data transmission section at all. In the present invention, the above priority is used at the data multiplexing section and transmission section to control increase of the data amount by selecting an error-correction coding method according to the priority of each object, and by performing the error-correction coding according to the selected error-correction coding method. Thereby, it is possible to eliminate pauses in reproduction in moving picture and audio at the receiving side, and control the degradation of data in reproduction of contents, while the real-time transmission of objects is maintained.

First Embodiment

Figure 2:
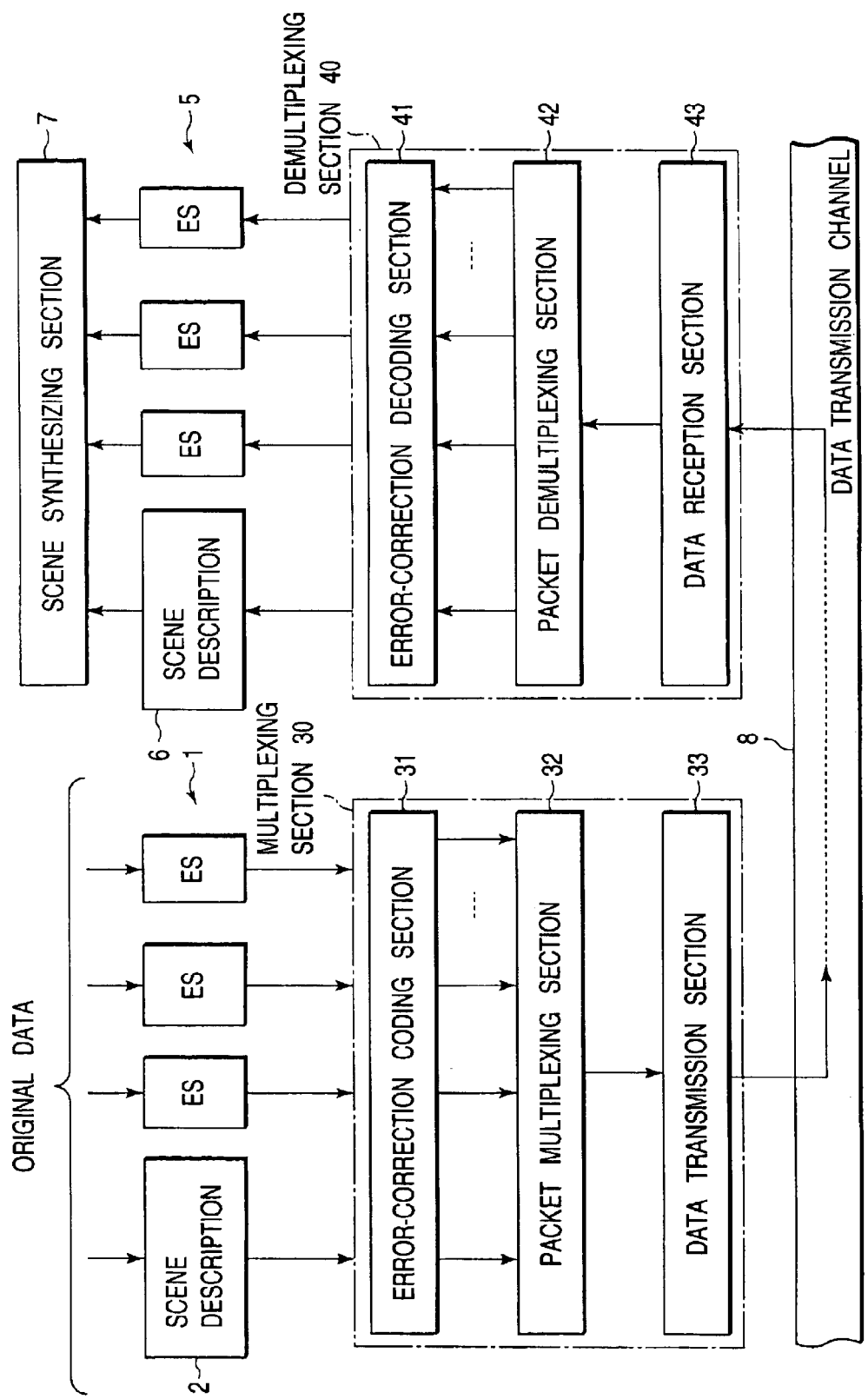
FIG. 2 shows a block diagram of a configuration example of a first embodiment of a data transmission apparatus according to the present invention.

FIG. 2 shows an example (block diagram) of overall system of the first embodiment. The parts similar to those previously shown in FIG. 1 are denoted by the same reference numbers, and detailed description will be eliminated.

A data multiplexing section 30 multiplexes coded data from the object coding sections 1 and the scene description coding section 2, and the multiplexed data is transmitted to the receiving side through the data transmission channel 8. The data multiplexing section 30 comprises an error-correction coding section 31, a packet multiplexing section 32, and a data transmission section 33. The error-correction coding section 31 selects an error-correction method, based on priority information of the coded data, and has a function to perform error-correction coding the code data, using the selected error-correction method.

The error-correction coding section 31 receives the coded scene description reflecting the intention of an author who produces contents and makes a relationship table between each of the elementary streams and its priority as shown in Table 1. The error-correction coding section 31, based on the priority information of the stream, selects an error-correction method, and performs error-correction coding of each stream with the selected error-correction method. The error-correction coding section 31 also has a function to perform error-correction coding of the scene description, similarly to each stream. The scene description is regarded as the most important data.

TABLE 1

| Stream | Priority |
| --- | --- |
| ES_ID1 | 16 |
| ES_ID2 | 8 |
| ES_ID3 | 4 |

The packet multiplexing section 32 receives each coded stream and scene description after error-correction coding by the error-correction coding section 31, multiplexes them, and makes them into packet data for transmission on the data transmission channel 8. The data transmission section 33 adds necessary header based on individual transmission protocol to the packet with the above configuration, and outputs the packet data to the data transmission channel 8.

A data demultiplexing section 40 demultiplexes the multiplexed data received through the data transmission channel 8 into the coded elementary stream and coded scene description. The data demultiplexing section 40 comprises a data reception section 43, a packet demultiplexing section 42, and an error-correction decoding section 41. The data reception section 43 receives the packet data transmitted on the data transmission channel 8, and the packet demultiplexing section 42 demultiplexes the packet data received by the data reception section 43 into the coded elementary stream and coded scene description based on the multiplexing header part.

The error-correction decoding section 41 obtains the priority of each coded elementary stream from coded scene description, and performs error-correction decoding based on the error-correction method according to the priority. When the error-correction method used for the error-correction coding is, for example, a plural-time transmission method, a repeated time for each code is determined according to the priority. The section 41 has a function for reproducing the elementary streams and coded scene description by removing bits from each stream and the coded scene description by the repeated times.

The object decoding sections 5 decode the elementary streams to reproduce the object data. The scene description decoding section 6 decodes the coded scene description. The scene synthesizing section 7 synthesizes the object data from the object decoding sections 5 for reproduction, based on the scene description from the scene description decoding section 6.

In the device having such configuration, each object such as moving pictures and audio is compressed and coded by the object coding section 1. Each coded object data is made into one stream which is called as an elementary stream (ES).

The scene description, which is information for reproduction of one scene by synthesizing the objects, is coded by the scene description coding section 2.

The data multiplexing section 30 performs error-correction coding of the elementary streams ES and scene description, multiplexes them, and sends the multiplexed data to the data transmission channel 8.

The feature of the present embodiment is to protect data with relatively greater importance at data transmission on a transmission channel with possible errors by performing error-correction according to the priority, referring to stream priority information included in the MPEG-4 objects as information on the priority of objects not only in the MPEG-4 system, but also in the data multiplexing section 30.

In the MPEG-4, the priority information of each stream is included in the scene description for use in reproduction of images. Then, in this embodiment, an appropriate error-correction method of each object has been selected according to the priority information. In order to select the method, the error-correction coding section 31 analyzes the priority information based on the scene description, and selects an appropriate error-correction method of each object.

However, the information on the scene description is made into data in binary form in the case of MPEG-4, and then, there are some difficulties for the data multiplexing section 30 to analyze the priority. For such cases, it is possible to provide another interface different from the scene description coding section 2, and the priority information may be input through the above interface to the data multiplexing section 30.

The error-correction coding section 31 makes a relationship table (Table 1) between each stream and its priority, using information on the scene description.

In the case of an example shown in Table 1, the stream of "ES_ID1" has priority "16", one of "ES_ID2" priority "8", one of "ES_ID3" priority "4", and the like.

Then, the error-correction coding section 31 selects an error-correction method based on the priority of the stream. In general, the error-correction methods by FEC (forward error-correction) are roughly classified into two methods shown in the following.

[1] A method in which the same data are repeatedly transmitted a plurality of times (plural-time transmission method).

[2] A method in which codes are used so as to correct errors (error-correction coding).

Hereinafter, an example adopting the former type, the plural-time transmission method will be described.

In plural-time transmission method, one bit-field is simply repeated a plurality of times according to the level of error-correction. The receiving side estimates the bit, for example, by a majority method. For example, in the case of an error-correction coding where the number of repetition is three, if contents of the data of a certain one bit-field includes one "0", and two "1"s, the bit is judged to be "1". It may be possible to theoretically perform 100% error-correction for random errors with 33 [%] by the three-time transmission method at the receiving side. Hereinafter, the plural-time transmission method is assumed to be adopted in the present embodiment, for simplicity.

As a method to determine an appropriate level (the number of repetition) of the error-correction method used for the plural-time transmission method, it is assumed to be selected by a value obtained by multiplication of a certain constant k by the priority of objects. That is, the number of repetition for the priority of objects is selected by the following equation:

$$\text{Number of repetition} = \text{priority of streams} \times k \quad (1)$$

where, a word of the priority of streams is used, in stead of a word of the priority of objects, in the equation (1), but they actually denote the same, though the word of the priority streams is used, considering that the priority is given to a data stream as the error-correction coding is performed for data streams to be transmitted, and the target is a data stream.

Now, if Table 1 shows the relationship between streams and priorities, numbers of repetition selected based on the equation (1) are shown in Table 2. Where k=0.3.

TABLE 2

| Stream | Priority | Repetition number |
|---|---|---|
| ES_ID1 | 16 | 4 |
| ES_ID2 | 8 | 2 |
| ES_ID3 | 4 | 1 |

The case of an example shown in Table 2 shows that a stream of "ES_ID1" has a priority of 16, and the number of repetition is 4; a stream of "ES_ID2" has a priority of 8, and the number of repetition is 2; and a stream of "ES_ID3" has a priority of 4, and the number of repetition is 1; and the like.

Thus, the error-correction coding section 31 performs error-correction coding of data of each stream selected by the error-correction method based on the priority.

Figure 3:
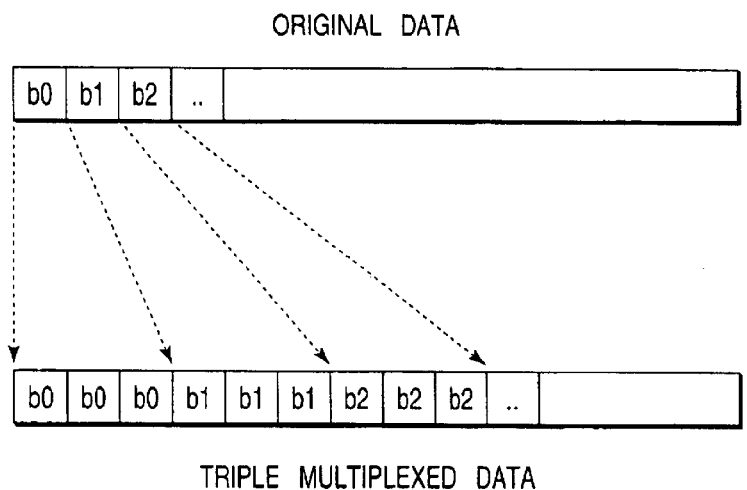
FIG. 3 shows a view for explaining an FEC method according to plural-time transmission method as one embodiment of the error-correction coding methods.

FIG. 3 shows a configuration example of packets where the plural-time transmission method is used for error-correction, and the number of repetition is 3. That is, when original data is formed of b0, b1, b2, . . . , and the number of repetition is 3 in the plural-time transmission method, the packet configuration is: b0, b0, b0, b1, b1, b1, b2, b2, b2, . . . , where the same bit is repeated by three.

The error-correction coding section 31 also performs error-correction coding of the scene description similarly to the streams. As the scene description is the most important data, error-correction coding is performed for the data with the greatest importance. For example, it is assumed that the scene description has the priority twice the highest one in the priority among streams. Therefore, the number of repetition becomes six times in the example of FIG. 3.

The data after error-correction coding by the error-correction coding section 31 are delivered to the packet multiplexing section 32. The packet multiplexing section 32 multiplexes the data of each stream and the scene description after error-correction, and makes them into one packet for transmission on the data transmission channel 8.

Figure 4:
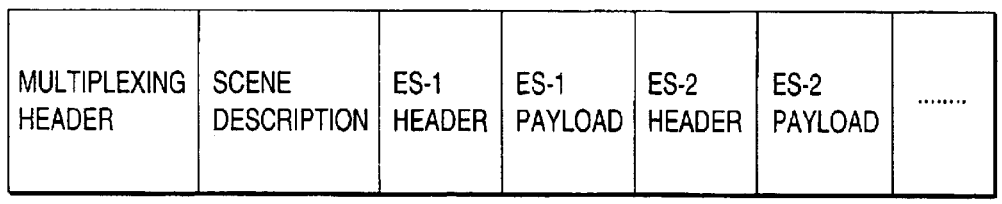
FIG. 4 shows a view of a packet configuration for a packet multiplexing section of the first embodiment.

FIG. 4 shows a packet configuration example in the packet multiplexing section 32. The configuration of the packet is as shown in FIG. 4: multiplexing header, scene description, ES_1 header, ES_1 payload, ES_2 header, ES_2 payload, and . . . , where ES_1, ES_2, denote No. 1, No. 2, of the elementary stream ES.

The transmission section 33 adds a necessary header based on a transmission protocol to the packet comprised in the above manner; and outputs the packet to the data transmission channel 8.

Now, processing in the receiving system will be described. In the receiving system, the data transmitted through the data transmission channel 8 is received by the data demultiplexing section 40. Specifically, the data reception section 43 receives the packet data from the transmission side transmitted as packet in a form shown in FIG. 4, and supplies it to the packet demultiplexing section 42.

The packet demultiplexing section 42 demultiplexes the received packet into the streams and scene description, referring to the multiplexing header, and supplies them to the error-correction decoding section 41.

The error-correction decoding section 41 obtains the priority of each stream from the scene description, and selects the number of repetition, based on the above equation (1). The scene description is made into a binary form in the case of the MPEG-4, and it is difficult to analyze it at the data demultiplexing section 40. Therefore, once the scene description information is supplied to the scene description decoding section 6, the analyzed object priority information is supplied to the data demultiplexing section 40 through another interface.

The error-correction decoding section 41 performs error-correction decoding of the code, based on the information on the number of repetition obtained through the above selection. An error-correction decoding method used for the above case is the above selection method by majority.

As shown above, as there is less degradation in data quality due to data errors for objects with higher importance by transmitting data after performing error-correction coding with changing the error-correction ability, according to the priority of each object given beforehand when performing error-correction coding for transmission of each object of MPEG-4, data transmission with high quality may be realized in the present embodiment. As the error-correction coding is performed, changing the level of the error-correction according to the priority of each object, the amount of data is increased for the important one, and it is decreased for less important one. Therefore, data transmission with high quality may be realized without excessively increased amount of data, and with real-time transmission.

In the above embodiment, the error-correction coding method is adaptively changed in each object, based on the importance of objects composing a content, and it is possible to obtain data reproduction quality similar to the intention of a content author at the data receiving side in data transmission through a data transmission channel with unavoidable data errors, though the quality of the transmission channel is not considered.

But, an ideal fine control may become possible by consideration of the quality of the channel. For example, the level for error-correction may be lowered on a transmission channel with less possibility of error generation, and it may be required to further raise the error-correction level for keeping the data reproduction quality on the channel with increased possibility of the generation.

Then, a second embodiment with consideration of the quality of the transmission channel will be described hereinafter.

Second Embodiment

In the present embodiment, a detector for detecting traffic on the data transmission channel 8 is newly installed, and there is shown an example where the error-correction coding method is selected based on the output of the detector as well as the priority. In this embodiment, traffic situation on the data transmission channel 8 is detected, using the detector to detect traffic on the data transmission channel 8, in addition to the configuration of the first embodiment. Thereby, the data receiving side may obtain further higher data reproduction quality, and it is possible to prevent the degradation in reproduction of objects from received data with data errors caused on the transmission channel 8, without causing excessively increased amount of data, and while maintaining real-time transmission, in data transmission of objects.

FIG. 5 shows an example of a principal portion of a system in the present embodiment. A basic configuration is the same as that of the first embodiment shown in FIG. 2, comprising the object coding sections 1 (not shown) coding the object data; scene description coding section 2 (not shown) for coding the scene description; data multiplexing section 30 multiplexing data from the object coding sections 1 and the scene description coding section 2, and transmitting the multiplexed data to the data transmission channel 8; data demultiplexing section 40 (not shown) demultiplexing the multiplexed data transmitted through the data transmission channel 8; object decoding sections 5 (not shown) decoding the streams; scene description decoding section 6 (not shown) decoding the coded scene description; and scene synthesizing section 7 (not shown) synthesizing scenes, based on the object data from the object decoding sections 5, and the scene description from the scene description decoding section 6 to reproduce images.

The data multiplexing section 30 according to the second embodiment also comprises the error-correction coding section 31, packet multiplexing section 32, and data transmission section 33. Moreover, a transmission traffic detector 50 to detect a traffic state on the data transmission channel 8 is newly installed, other than the above sections, in the present embodiment.

The transmission traffic detector 50 detects the quality (data error incidence, data transmission rate, and the like) of the data transmission channel 8 during communication. The error-correction coding section 31 receives the scene description reflecting the intention of a content author; makes a relationship table between each stream and the priority, for example, as shown in Table 1; then, selects an error-correction coding method, based on the priority of the stream; and performs error-correction coding of each stream with the selected error-correction coding method. The error-correction coding section 31 has a function to perform error-correction coding of data of the scene description, similarly to the case of each stream. As the scene description is the most important data, the description is configured to be coded for error-correction as data with the greatest importance.

Moreover, the error-correction coding section 31 has a function to perform error-correction coding of each stream according to the quality of the data transmission channel 8 detected by the transmission traffic detector 50. The error-correction coding section 31 is configured so that the error-correction coding method selected based on the priority given to each stream may be added, and the error-correction ability may be changed according to the quality of the transmission channel 8 in the error-correction coding method of the first embodiment, by applying an error-correction coding method selected according to the quality of the data transmission channel 8.

The packet multiplexing section 32 receives data of each stream and scene description after error-correction by the error-correction coding section 31, multiplexes them into packet data (one stream for data transmission). The data transmission section 33 adds a necessary header based on a transmission protocol to the packet configured as above, and outputs the packet data to the data transmission channel 8.

In the present embodiment, the basic configuration is similar to that of the first embodiment, except processing in the error-correction coding section 31 and the transmission traffic detector 50.

The feature of the present embodiment is in processing in the error-correction coding section 31 and the transmission traffic detector 50. The processing in the two blocks will be mainly described hereinafter.

The transmission traffic detector 50 detects the quality of the traffic on the data transmission channel 8 during communication. The quality denotes:

data error incidence;

data transmission rate; and the like. In the present embodiment, the data error incidence is detected. The information on the quality of the traffic detected in the transmission traffic detector 50 is appropriately transmitted to the error-correction coding section 31.

The error-correction coding section 31 performs error-correction coding of each stream based on the data error incidence information detected by the transmission traffic detector 50 and the stream priority which is described in the scene description.

It is assumed that the plural-time transmission method is used as a method of the error-correction coding. The number of repetition to determine the error concealment is defined by the following expression. If it is assumed that, for example, $\epsilon 1$ is a mean error incidence, $\epsilon 2$ is the present error incidence, and a certain constant k, the number of repetition may be selected by the following equation:

Number of repetition:

$$1+(\text{stream priority})\times(\epsilon 2/\epsilon 1)\times k \quad (2)$$

Thus, in addition to the first embodiment, it is possible to perform more efficient data transmission suitable for the state of the data transmission channel 8 by changing the error-correction level according to the quality of the data transmission channel 8.

As mentioned above, the present embodiment is a transmission system to multiplex and transmit a plurality of objects through the transmission channel 8. In the data transmission apparatus in which priority of each object is previously given, and real-time transmission is required, the communication traffic detector 50 which detects the quality of the traffic of the transmission channel 8 is installed; and the error-correction coding section 31 is installed. The data multiplexing section 30 has a function to determine an error-correction coding method for each object, based on the quality information on the traffic obtained by the communication traffic detector 50, and the priority given to each object.

The communication traffic detector 50 detects the quality of the traffic of the transmission channel 8, for example, data error incidence, data transmission rate, and the like. In the error-correction coding section 31, the error-correction coding method with required error-correction ability is selected, based on the quality information on the traffic, and the priority given to each object. Error-correction coding of each object is performed with the selected error-correction coding method. Data after the error-correction coding are multiplexed by the multiplexing section 32, and delivered to the transmission channel 8 through the data transmission section 33. There have been known several error-correction coding methods. For example, if plural-time transmission method is used, as a determining factor for the error-correction ability is the number of repetition, the above number of repetition is defined as follows.

For example, the number is $1+(\text{stream priority})\times(\epsilon 2/\epsilon 1)\times k$, if it is assumed that the mean error incidence is set as $\epsilon 1$, the present error incidence as $\epsilon 2$ and a certain constant as k.

Thus, more efficient data transmission suitable for the situation of the transmission channel 8, and data transmission to prevent degradation in reproduced content, while maintaining real-time transmission, is realized by performing error-correction coding by changing the error-correction level according to the quality of the transmission channel in addition to the priority of the stream.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, in the above embodiments, the error-correction level is changed according to the object priority (the importance of the object), but it is possible that transmission of objects with lower priority, for example, a background part, is stopped at the data multiplexing and transmission section without changing the error-correction coding method. For example, it is possible to stop one of error-correction coding, multiplexing, and transmission at the transmission side and to stop error-correction decoding at the reception side based on the priority. Further, it may be conceivable that transmission of objects with lower priority than a certain level is stopped, when the communication quality of the transmission channel is temporarily degraded by feedback from the traffic detector, and the data transmission rate is lowered.

The present invention may realize an apparatus with further more efficient data transmission by installing a monitor of the traffic state on the data transmission channel and considering the traffic information from the monitor. For example, if there are a plurality of transmission channels, it is possible to assign a transmission channel with less error incidence for objects with greater importance, or stop data transmission in a unit of an object, in addition to changing the error-correction coding method. Thereby, it is possible to realize a system to transmit important object data in real-time, depending on the situations.

As mentioned above in detail, according to the present invention, in data transmission through a data transmission channel with unavoidable data error incidence, the data receiving side may obtain data reproduction quality approximately according to the intention of a content author by adaptively changing the error-correction coding method every object based on the importance of object, or the data receiving side may obtain further better data reproduction quality by detecting the traffic state on the data transmission channel, and by adaptively changing the error-correction coding method according to the detection result. It is possible to provide a data transmission apparatus to prevent the degradation in object reproduction from received data with data errors caused during transmission on the transmission channel while maintaining the real-time transmission without excessive increased amount of data in data transmission of objects.

What is claimed is:

1. A data transmission apparatus for transmitting multimedia data comprising kinds of data having respective priority, the apparatus comprising:

means for selecting an error-correction coding method for each of the kinds of data based on the priority of each of the kinds;

means for error-correction coding of each of the kinds of data using the selected error-correction coding method; and means for multiplexing plurality of coded data and transmitting multiplexed data through a transmission channel, wherein the error-correction coding method is based on a plural-time transmission method and said selecting means determines the number of times of transmission in the plural-time transmission method based on the priority.

2. The data transmission apparatus according to claim 1, further comprising means for stopping at least one of error-correction coding, multiplexing the coded data, and transmission of the multiplexed data based on the priority.

3. The data transmission apparatus according to claim 1, further comprising means for detecting a traffic quality of the transmission channel, and wherein said selecting means selects an error-correction coding method based on the kind and the traffic quality.

4. The data transmission apparatus according to claim 3, wherein the error-correction coding method is based on a plural-time transmission method and said selecting means determines the number of times of transmission in the plural-time transmission method based on the priority and the traffic quality.

5. The data transmission apparatus according to claim 3, further comprising means for stopping at least one of error-correction coding, multiplexing the coded data, and transmission of the multiplexed data based on the priority and the traffic quality.

6. A data reception apparatus for receiving coded transmission multi-media data comprising kinds of coded data, each kind having a priority, the apparatus comprising:

means for receiving and demultiplexing the coded transmission data into the kinds of coded data;

means for detecting the priority of each kind; and means for error-correction decoding of each of the kinds of the coded data based on the priority detected by said detecting means, wherein the coded transmission data is based on a plural-time transmission coding method and said error-correction decoding means determines a value of the coded data using a majority method based on the priority.

7. The data reception apparatus according to claim 6, further comprising means for stopping an operation of said error-correction decoding means based on the priority.

8. The data reception apparatus according to claim 6, further comprising means for detecting a traffic quality of a transmission channel for transmitting the coded data, and wherein said error-correction decoding means error-correction decodes the coded data based on the priority and the traffic quality detected by said detecting means.

9. The data reception apparatus according to claim 8, wherein the coded transmission data is based on a plural-time transmission coding method and said error-correction decoding means determines a value of the coded data using a majority method based on the priority and the traffic quality.

10. The data reception apparatus according to claim 8, further comprising means for stopping an operation of said error-correction decoding means based on the priority and the traffic quality.

11. A data transmission method for transmitting multi-media data comprising kinds of data having respective priority, the method comprising the following steps of:

selecting an error-correction coding method for each of the kinds of data based on the priority;

error-correction coding of each of the kinds of data using the selected error-correction coding method; and multiplexing plurality of kinds of coded data and transmitting multiplexed data through a transmission channel, wherein the error-correction coding method is based on a plural-time transmission method and said selecting step determines the number of times of transmission in the plural-time transmission method based on the priority.

12. The data transmission method according to claim 11, further comprising a step of stopping at least one of error-correction coding, multiplexing the kinds of coded data, and transmission of the multiplexed data based on the priority.

13. The data transmission method according to claim 11, further comprising a step of detecting a traffic quality of the transmission channel, and wherein said selecting step selects an error-correction coding method based on the priority of each kind of data and the traffic quality.

14. The data transmission method according to claim 13, wherein the error-correction coding method is based on a plural-time transmission method and said selecting step determines the number of times of transmission in the plural-time transmission method based on the priority and the traffic quality.

15. The data transmission method according to claim 13, further comprising a step of stopping at least one of error-correction coding, multiplexing the coded data, and transmission of the multiplexed data based on the priority and the traffic quality.

16. A data reception method for receiving coded transmission data comprising kinds of coded data, each having a priority, the method comprising the following steps of:

receiving and demultiplexing the coded transmission data into the kinds of coded data;

detecting the priority of each kind of coded data; and error-correction decoding of each of the kinds of the coded data based on the priority detected by said detecting step, wherein the coded transmission data is based on a plural-time transmission coding method and said error-correction decoding step determines a value of the coded data using a majority method based on the priority.

17. The data reception method according to claim 16, further comprising a step of stopping an operation of said error-correction decoding step based on the priority.

18. The data reception method according to claim 16, further comprising a step of detecting a traffic quality of a transmission channel for transmitting the coded data, and wherein said error-correction decoding step error-correction decodes the coded data based on the priority and the traffic quality detected by said detecting step.

19. The data reception method according to claim 18, wherein the coded transmission data is based on a plural-time transmission coding method and said error-correction decoding step determines a value of the coded data using a majority method based on the priority and the traffic quality.

20. The data reception method according to claim 18, further comprising a step of an operation of said error-correction decoding step based on the priority and the traffic quality.

* * * * *

UNITED STATES PATENT AND TRADEMARK OFFICE
CERTIFICATE OF CORRECTION

PATENT NO. : 6,826,233 B1
DATED : November 30, 2004
INVENTOR(S) : Oosawa

It is certified that error appears in the above-identified patent and that said Letters Patent is hereby corrected as shown below:

Column 14,
Line 55, change "of an" to -- of stopping an --.

Signed and Sealed this

Eighth Day of March, 2005

JON W. DUDAS
*Director of the United States Patent and Trademark Office*